J. M. EVANS.
CARBURETER.
APPLICATION FILED AUG. 20, 1915.
1,232,259.
Patented July 3, 1917.
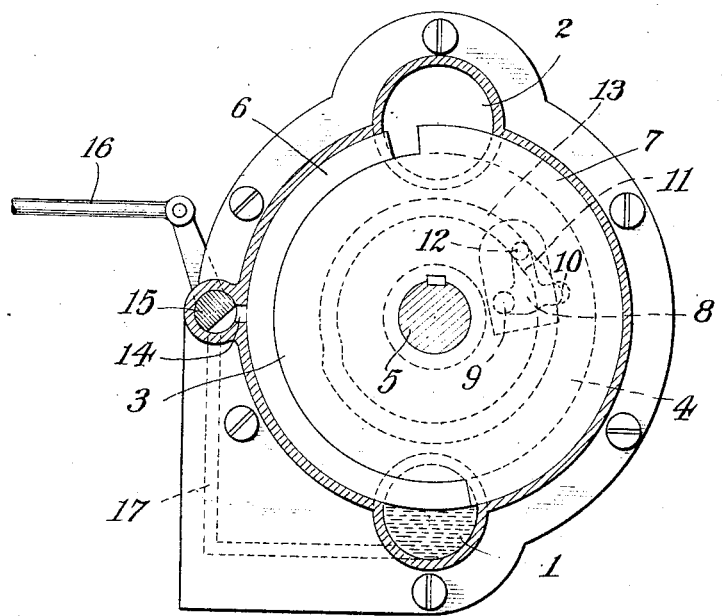
Witnesses:
Inventor
James M. Evans
By his Attorneys
Sheffield & Betts

UNITED STATES PATENT OFFICE.

JAMES M. EVANS, OF WESTPORT, CONNECTICUT, ASSIGNOR TO EVANS ENGINE COMPANY, INCORPORATED, A CORPORATION OF NEW YORK.

CARBURETER.

1,232,259.  Specification of Letters Patent.  Patented July 3, 1917.

Application filed August 20, 1915. Serial No. 46,428.

*To all whom it may concern:*

Be it known that I, JAMES M. EVANS, a citizen of the United States, and a resident of Westport, county of Fairfield, State of Connecticut, have invented certain new and useful Improvements in Carbureters, of which the following is a specification accompanied by drawings.

In my application, Serial No. 16,338, filed March 23, 1915, I described an invention consisting of a device for conveying measured charges of liquid from a reservoir chamber into a mixing chamber in which the liquid so delivered was mixed with air or other gas. The uses, to which the device so described is adapted, include the mixing of hydrocarbons with air in internal combustion engines, the enriching of gases for illuminating, heating and other purposes, and in fact the mixing of any liquid, finely separated or vaporized, with any gas for any purpose for which such an admixture of liquid and gas may be desired.

The object of this present invention is to improve upon the device of the aforementioned application by providing convenient manually adjustable means for varying at will the relative amount of liquid to be mixed with the gas.

The particular means which I have disclosed for regulating the mixture, comprise a by-pass interposed between the reservoir chamber and the mixing chamber by means of which a portion or all of the liquid conveyed from the reservoir chamber is by-passed before it reaches the mixing chamber, thereby reducing the amount of liquid delivered into the mixing chamber, or entirely cutting it off.

Referring now to the drawing, reference numeral 1 designates the reservoir chamber, which may be supplied with liquid, preferably under slight pressure, by any suitable means. The mixing chamber is shown at 2 and a suitable conveyer is employed for conveying liquid from the reservoir chamber 1 and delivering it into the mixing chamber 2. For this purpose I employ the carrier herein shown, which comprises the disks 3—4 mounted on the shaft 5. One of the disks, such for instance, as disk 3, is keyed to the shaft as shown, and the other disk is loosely mounted thereon and provided with means which will be hereinafter described, for producing relative movement between it and the shaft periodically. The disks 3—4 are provided with flanges 6—7 respectively at the outer edge thereof, each flange extending slightly less than half the distance around the periphery of the disk and protruding transversely, so as to overlap the unflanged portion of the periphery of the adjacent disk. As a result of this construction, it is evident that by moving the disk 4 relatively to disk 3, a recess between the adjacent ends of the two flanges 6—7 may be produced at either of two points. In the position shown in the drawing, this recess occurs at the top of the disks at the entrance to the mixing chamber 2.

The means for periodically producing relative movement between the two disks to open and close the recesses above described may comprise a three-armed lever, such as is shown at 8 in the drawing. One arm 9 of this lever may be pivotally connected to one of the disks, such for instance as disk 3, another arm 10 may be pivotally connected to the other disk 4 and the third arm 11 may be provided with a roll 12 adapted to ride in a fixed cam slot 13. As shown in the drawing, this cam slot is provided at two points, preferably diametrically opposite, with irregular portions adapted to move the lever 8 angularly as the disks rotate in a clockwise direction to thereby effect the movement of one of the disks relatively to the other. This relative movement of the disks will cause the opening of one of the recesses formed in the periphery thereof and will cause the closing of the other such recess.

The operation of the above described carrier is as follows:

Assuming the parts to be in the position in which they appear in the drawing, it is seen that as the disks continue in their clockwise rotation, the roll 12 will ride in one of the irregular portions of the cam 13, so that a recess will be formed between the flanges 6, 7 at the bottom of the carrier in the reservoir chamber, which recess will receive therein a charge of liquid to be delivered into the mixing chamber. A further semi-rotation of the disks brings this recess to the entrance of the mixing chamber 2, at which time the roll 12 has reached the next irregular portion of the cam 13, as a result of which the recess containing the liquid is closed on entering the mixing chamber, thereby ejecting the liquid into the mixing chamber.

The above described mechanism is that of my prior application and constitutes *per se* no part of my present invention.

I will now proceed to describe the improvement which constitutes my present invention.

Adjacent the path of travel of the liquid carrier, I provide a by-pass indicated at 14, whereby a portion or all of the liquid conveyed by the carrier may be by-passed before it reaches the mixing chamber to thereby vary the amount of liquid delivered into the mixing chamber or to shut off entirely the delivery of the liquid. I also provide this by-pass with a suitable controlling device 15, by means of which the amount of liquid to be by-passed may be nicely adjusted, thereby adjusting the amount of liquid delivered into the mixing chamber, and if desired, shutting off temporarily the delivery of any liquid into the mixing chamber. The controlling device 15 may be of any suitable form and I preferably provide means, such as indicated at 16, extending to some convenient point, whereby the operator may adjust the controlling device without changing his position. For example, if this improved carbureter is used in the internal combustion engine of a motor vehicle, the operating means for the controlling device 15 preferably extends to the dash, so that the quality of the mixture may readily be varied by the driver without any inconvenience.

Preferably I provide means, such as indicated at 17, for reconveying the by-passed liquid into the liquid reservoir.

From the above, it is apparent that I have provided a convenient, simple and inexpensive means for controlling at will the amount of liquid to be delivered into the mixing chamber and thus controlling the quality of the mixture produced therein, also for shutting off temporarily the delivery of liquid.

While I have shown and described but a single means for accomplishing the objects of my invention, it is to be understood that many changes may be made therein, without departing from the spirit of my invention.

What I claim is:

1. In a device of the character described, the combination of a reservoir chamber for liquid, a mixing chamber, a movable carrier adapted to move from the reservoir chamber to the mixing chamber to convey liquid from the one to the other, said device being provided intermediate said chambers with a passage-way contiguous to the path of movement of said carrier, for by-passing a portion or all of the liquid during the movement of said carrier from one chamber to the other.

2. In a device of the character described, the combination of a reservoir chamber for liquid, a mixing chamber, a movable carrier adapted to move from the reservoir chamber to the mixing chamber to convey liquid from the one to the other, said device being provided intermediate said chambers with a passage-way contiguous to the path of movement of said carrier, and with a manually adjustable valve for controlling the amount of liquid by-passed through said passage-way during the movement of said carrier from one chamber to the other, and thereby determining the amount of liquid to be delivered to said mixing chamber.

3. In a device of the character described, the combination of a reservoir chamber for liquid, a mixing chamber, a movable carrier adapted to convey liquid from the reservoir chamber and deliver it to the mixing chamber, said carrier comprising a rotatable disk having a recess at its outer edge adapted to move from the reservoir chamber to the mixing chamber, and means located intermediate said chamber and contiguous to the path of movement of said recess for varying the amount of liquid delivered into the mixing chamber and for shutting it off.

4. In a device of the character described, the combination of a reservoir chamber for liquid, a mixing chamber, a carrier for conveying liquid from the reservoir chamber and delivering it to the mixing chamber, said carrier comprising a rotatable disk having a recess at its outer edge, and means located adjacent the path of travel of said carrier for by-passing a portion or all of the liquid so conveyed.

5. In a device of the character described, the combination of a reservoir chamber for liquid, a mixing chamber, a carrier for conveying liquid from the reservoir chamber and delivering it to the mixing chamber, said carrier comprising a rotatable disk having a recess at its outer edge, and manually adjustable means located adjacent the path of travel of the carrier for by-passing adjusted portions or all of the liquid for the purpose described.

In testimony whereof I have signed this specification in the presence of two subscribing witnesses.

JAMES M. EVANS.

Witnesses:
HENRY M. WARD,
RALPH KIRBY.